United States Patent [19]
Makansi

[11] Patent Number: 6,120,710
[45] Date of Patent: Sep. 19, 2000

[54] RAINBOW AND HOLOGRAM IMAGES ON FABRICS

[76] Inventor: Munzer Makansi, 106 Stratford Way, Signal Mountain, Tenn. 37377

[21] Appl. No.: 09/248,191

[22] Filed: Feb. 9, 1999

Related U.S. Application Data

[63] Continuation-in-part of application No. 08/777,821, Dec. 31, 1996, Pat. No. 5,882,770.
[51] Int. Cl.⁷ ...................................................... B29D 11/00
[52] U.S. Cl. ........................... 264/1.34; 264/1.31; 264/2.7
[58] Field of Search ................................. 264/1.31, 1.34, 264/1.35, 1.1, 2.7

[56] References Cited

U.S. PATENT DOCUMENTS

| | | | |
|---|---|---|---|
| 4,761,253 | 8/1988 | Antes | 264/1.34 |
| 4,842,405 | 6/1989 | El-Sherif. | |
| 4,913,858 | 4/1990 | Miekka et al. | 264/1.34 |
| 4,956,040 | 9/1990 | Fry. | |
| 5,956,164 | 9/1999 | Waitts | 264/1.34 |

FOREIGN PATENT DOCUMENTS

| | | | |
|---|---|---|---|
| 62-170510 | 7/1987 | Japan. | |
| 63-275774 | 11/1988 | Japan | 264/1.31 |
| 63-309639 | 12/1988 | Japan. | |
| WO 89/01063 | 2/1989 | WIPO. | |
| WO 91/12365 | 8/1991 | WIPO. | |

*Primary Examiner*—Mathieu D. Vargot
*Attorney, Agent, or Firm*—Lawrence Isakoff

[57] ABSTRACT

A process is provided for making a fibrous sheet that produces rainbow and/or hologram images. A sheet having an outer surface composed of fibrous elements has its outer surface embossed with a pattern of fine grooves that are substantially aligned from fibrous element to fibrous element. In contrast, prior fabrics for producing rainbow or hologram images were laminated to plastic or metal foils having pre-embossed patterns of grooves. Sheets and fabrics of the present invention are free from such impermeable foils and retain desirable attributes of breathability and other aesthetic qualities.

7 Claims, 2 Drawing Sheets

RAINBOW AND HOLOGRAM IMAGES ON FABRICS

CROSS-REFERENCE TO RELATED APPLICATION

This is a continuation-in-part of application Ser. No. 08/777,821, filed Dec. 31, 1996, now U.S. Pat. No. 5,882,770, issued Mar. 16, 1999.

BACKGROUND OF THE INVENTION

1. Field of the Invention

This invention relates generally to sheets embossed with diffraction grating and/or hologram patterns. More particularly, the invention concerns a fibrous sheet or fabric whereon the diffraction grating and/or hologram pattern is embossed directly on a surface of the fibrous sheet or fabric without detrimentally affecting the flexibility and breathability of the sheet or fabric.

2. Description of the Prior Art

Rainbow and hologram images have been produced by diffracting light from patterns of very fine grooves on the surface of various plastic sheets or films. Such patterns are mass-produced by embossing the plastic surface under heat and pressure with a metal die (or "stamper") having in its face the desired pattern in relief Known methods for producing hologram images on fabrics generally are rather complicated and detrimentally affect certain properties of the fabrics. For example, U.S. Pat. No. 4,956,040 discloses a method in which a precut foil having a hologram pattern embossed on its surface is laminated between a clear polyester coating and an adhesive scrim backing to form a laminate which is then adhered to a woven fabric. International Patent Application WO 91/12365 discloses forming a laminate of an outer metal foil bearing a holographic image, a middle layer of plastic size and a lower layer of fabric. These two disclosures are typical of the many methods involving production of a hologram pattern on a plastic film or metal foil layer which is laminated to the surface of a fabric. Although such processes can provide strong holographic images, the portions of the fabric that are covered with the film or foil lose the breathability, flexibility and surface tactile aesthetics of the original fabric without the film or foil. International Patent Application WO 89/01063 and Japanese Patent Publication SHO 63-309639 disclose embossing a hologram pattern on a thin plastic film, slitting the film into long ribbons of 1 to 20 mm width, forming the ribbons into yarns and then making a fabric of the ribbons. However, fabrics made with such yarns are limited to localized glitter color effects and cannot produce large scale rainbow or hologram images. Further, the dimensions of the slit-ribbon yarns are usually too large for the ribbons to be used in apparel fabrics. For apparel fabrics, fiber diameter typically is in the range of 0.001 to 0.1 mm.

In other methods aimed at providing hologram images on fabrics, series of fine grooves are formed on individual filaments which are then formed into fabrics. For example, Japanese Patent SHO 62-170510 discloses simultaneously co-spinning two molten polymers into a filament and then dissolving one of the two polymer components to form fine grooves on the filament surface parallel to the axis of the filament. U.S. Pat. No. 4,842,405 discloses another method in which the fine grooves are cut in the surfaces of filaments with laser beams. Because the distances between adjacent filaments in the yarn and fabric are not controlled to be at multiples of groove width and because these filaments typically are made into yarns by plying, interlacing, crimping and/or twisting, the groove patterns are disrupted and fabrics made from such filament yarns do not provide full rainbow or hologram images but provide only glitter points or line segments of glitter randomly distributed on the fabric surface.

In summary, with regard to diffraction or hologram images on fabrics, the art discloses how to produce either (a) large rainbow and hologram images on impermeable plastic films or metal foils which are laminated or stitched to the surface of the fabric, but with accompanying detrimental effects on the breathability and tactile aesthetics of the fabric or (b) fine, microscopic glitter points on fabrics made from filaments having fine longitudinal grooves without affecting other fabric characteristics. Accordingly, an aim of the present invention is to provide a fibrous sheet or fabric having large rainbow and/or hologram images without incorporating an impermeable plastic or metal foil that would detrimentally affect the flexibility and breathability of the sheet or fabric.

SUMMARY OF THE INVENTION

The present invention provides a fibrous sheet having an outer surface comprising fibrous elements embossed with a multiplicity of fine diffraction grooves that are substantially aligned from fibrous element to fibrous element and form a pattern that produces rainbow and/or hologram images when the sheet is viewed at an angle to incident light. Preferably the fibrous elements are of thermoplastic synthetic organic polymers, most preferably of polypropylene, polyethylene, polyester or nylon.

The invention also provides a process for making the fibrous sheet that produces rainbow or hologram images. The process comprises the steps of (a) preparing a sheet of fibrous elements, (b) softening at least the fibrous elements on a surface of the sheet sufficiently to permit the fibrous elements on the sheet surface to be embossable under pressure with a pattern of fine diffraction grooves; (c) placing the sheet on a supporting surface; (d) bringing a hard embosser having a pattern of fine diffraction grooves thereon into direct contact with the surface of the fibrous sheet; (e) imposing sufficient load on the embosser for a sufficient time to impress the pattern of fine diffraction grooves into the surface of the fibrous elements on the surface of the sheet; (f) separating the sheet from the embosser; and (g) collecting the separated sheet.

Optionally, softening step (b) may be performed simultaneously with sheet/embosser contacting step (d) and/or pressure application step (e). Preferably, the fibrous sheet is made of thermoplastic fibrous elements of synthetic organic polymer and the fibrous elements are softened by heat or a solvent for the polymer. The process does not detrimentally affect the breathability, flexibility and aesthetic attributes of the starting fibrous sheet.

BRIEF DESCRIPTION OF THE DRAWINGS

The invention will be more readily understood by reference to the drawings wherein.

DETAILED DESCRIPTION OF PREFERRED EMBODIMENTS

Figure 1:
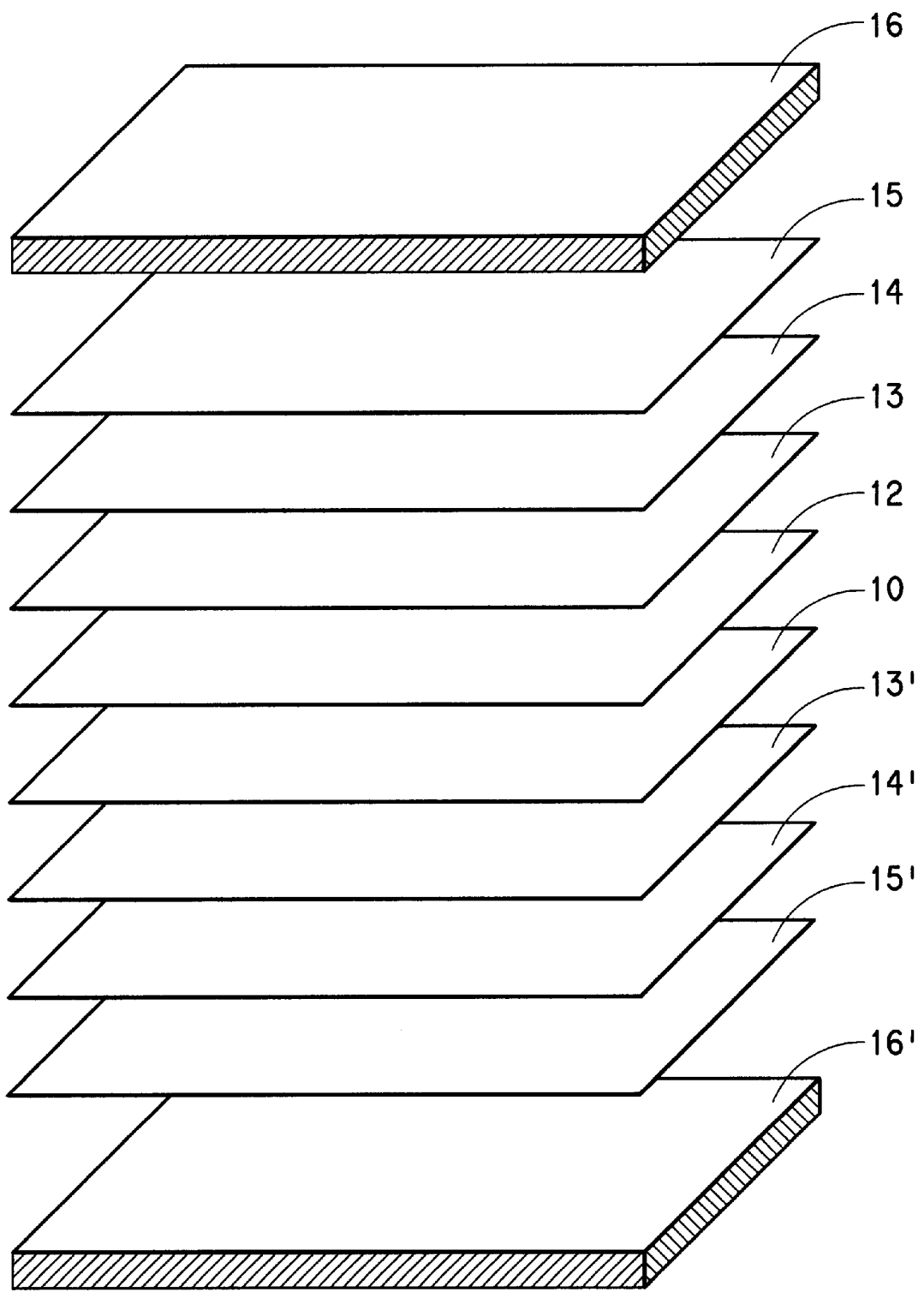
FIG. 1 is an exploded schematic view of a preferred assembly of items for batch-embossing fibrous sheet 10, the items including a hard embosser 12 (also called a "stamper"), release sheets 13, 13', rubber sheets 14, 14', flat metal plates 15, 15', and platens 16, 16' of a platen press (not shown)

The meanings of various terms used herein are as follows. "Fibrous sheet" means a knit, woven, spunbonded, spunlaced, stitchbonded, or felted fabric, or the like.

"Fibrous element" means any fiber, filament, thread, yarn, microfiber, fibril or the like of natural or synthetic polymer.

"Fine grooves" means parallel grooves or segments of parallel grooves that are spaced apart uniformly by about 0.1 to 10 micrometers (microns) and are at least 0.01 micron deep. The presence of groups of such grooves on a solid surface produces light diffraction patterns. Groups of straight, parallel fine grooves, also known as "diffraction gratings", produce rainbow colors, referred to hereinafter as "rainbow images". Clusters of parallel fine groove segments having straight, curved or wavy configurations, originated by a hologram imaging process, reproduce the original images in the form of hologram images.

The present invention provides a fibrous sheet having patterns of fine grooves on a surface of the sheet. The patterns of grooves produce rainbow or hologram images that are visible to the naked eye when the sheet surface is viewed at an angle to incident sunlight or incandescent light. The patterns of fine grooves or clusters of groove segments embossed on the individual fibrous elements of the surface of the fibrous sheet continue to neighboring fibrous elements substantially in phase such that the distance between the last groove on one fibrous element and the first groove on the neighboring fibrous element is a multiple (i.e., integer) of the groove width. Distinct rainbow or hologram images with good color, clarity and resolution are thereby produced.

The invention also provides a process for preparing a fibrous sheet that produces rainbow or hologram images without detrimentally affecting desirable attributes inherent in the sheet (e.g., breathability, flexibility, tactile aesthetics). In accordance with the process of the invention, (a) a sheet of fibrous elements is softened by either heat or a chemical agent, depending on the nature of the fibrous elements; (b) the surface of the softened fibrous sheet is brought into contact with the surface of a hard embosser having a pattern of fine grooves in the surface; (c) sufficient pressure is applied to embosser to cause the groove pattern to be embossed into the surface of fibrous elements on the surface of the sheet and (d) then the sheet is collected. Typically, the pressure is applied by the plates of a platen press or a pair of cooperating cylindrical rolls. The pressure is applied to the sheet for a time sufficient to emboss the embosser groove pattern to the surface of the outermost fibrous elements of the fibrous sheet. When embossing fibrous sheets of thermoplastic polymer, use of higher temperatures permits the use of lower embossing pressures and use of higher embossing pressures permits the use of lower embossing temperatures. Note that the steps of softening, heating and applying embosser pressure can be performed simultaneously or in any other order found advantageous for a particular fabric. To assure accurate transfer of the micron groove pattern of the embosser to the fibrous sheet, the embossing pressure is applied uniformly over the affected area of the sheet and stretching of the sheet is avoided when the sheet is removed from the embossing equipment.

The accurate transfer of the fine groove pattern to the fibrous sheet can be accomplished conveniently with a platen press, as illustrated in FIG. 1. In accordance with this method, a fibrous sheet 10 and an embossing stamper 12 are placed between two release sheets 13, 13' of a dimensionally and thermally stable material (e.g., ARMALON®, a TEFLON®-perfluoroethylene coated glass fabric) to form a first assembly. The first assembly is then placed between two heat resistant soft rubber sheets 14, 14' (e.g., of VITON® or silicone rubber) to form a second assembly. The second assembly is then placed between two flat plates 15, 15' of sheet metal to form a composite sandwich. The composite sandwich is then placed between platens 16, 16' in a flat platen press that was preheated to a desired temperature. Pressure is then applied for a predetermined time, after which the sandwich is removed from the press and the embossed sheet structure is separated from the stamper.

For sheets comprising fibrous elements of a thermoplastic polymer, such as a polyolefin, a polyamide or a polyester, the suitable temperature for the embossing is in a range between the softening temperature and the melting temperature of the fibrous material under the pressure applied during embossing. For a sheet comprising two types of fibrous elements, each formed from a different thermoplastic polymer, a suitable temperature for embossing the sheet usually is between the melting points of the two polymers. At such temperatures, the embossed pattern of fine grooves can provide the fabric surface with a clear rainbow or hologram image. The intensity of the resultant image pattern is increased by more intense embossing conditions, especially by increased pressure and temperature. However, at increasingly higher embossing temperatures there is a gradual increase in the tendency of the fibers to deform, interlock and even bond together at crossover points, with an attendant reduction in fiber mobility, breathability, flexibility and tactile aesthetics. If excessive temperatures and pressure are employed, the fibrous elements can melt and the sheet can become an impermeable film. Also, it is preferred that prior to embossing, the fibrous sheet should be scoured or washed free of materials such as spinning finish, size and gums used during fiber or fabric processing in order to avoid fouling of the embossing pattern of the stamper and minimize the evolution of smoke at the embossing temperatures.

The optimum embossing conditions for a particular fabric or sheet can be determined without undue experimentation, through a simple series of short tests at different temperatures, pressures and embossing times, in the particular equipment that is to be used. The optimum embossing conditions are those that provide the best looking rainbow or holographic images without sacrificing the desirable properties of fabric breathability, flexibility and tactile aesthetics. Such a series of tests run with a platen press on the woven nylon fabric of Example 1 below showed optimum embossing conditions to be a temperature of about 200 to 225° C., for 3 to 5 minutes, at a calculated pressure of 1,275 to 2,585 KiloPascals (185 to 375 psi) based on the area enclosed by the rigid steel plates 15 and 15' or a pressure of 17,595 to 35,673 Kpa (2,498 to 5,175 psi) based on the area enclosed by stamper 12. Substantially the same optimum conditions were found for the other nylon fabrics and the polyester fabrics of the Examples below. A similar series of preliminary tests on the polyethylene spunbonded sheet of Example 8 below showed the optimum embossing conditions to be about 3 minutes at a temperature in the range of 90 to 100° C. and a pressure in the range of 208 to 448 KPa (30 to 65 psi) based on the area enclosed by plates 15 and 15' or a pressure of 2,870 to 6,182 KPa (414 to 897 psi) based on the area of stamper 12. Example 12 showed that for a warp-knit polypropylene fabric in a continuous embossing process operating at a linear throughput of about 3 cm/minute, satisfactory results could be obtained at temperatures in the range of 135 to 150° C., with pressures of at least 1,310 KPa (190 psi). Typically, the intensity of the diffraction pattern, produced under optimum conditions is not as bright as a similar pattern produced on film. However, the optimum pattern is clearly visible and has an attractive, relatively subdued brightness, which makes it more desirable for apparel end uses than the flashy patterns typically produced on films.

For fibrous sheets made from fibrous elements that are not thermoplastic, such as cotton, rayon, cellulose or the like, prior to embossing, the sheet can be softened by treatment with a chemical softening agent, such as a swelling agent, plasticizer or partial solvent for the fibrous elements. After softening of the fibrous elements at the surface of the sheet, the fibrous sheet can be subjected to embossing under pressure in a manner substantially similar to that described for embossing sheets formed with thermoplastic elements. However, embossing or drying temperatures greater than the boiling temperature of the softening agent are avoided to prevent bubble formation.

Figure 2:
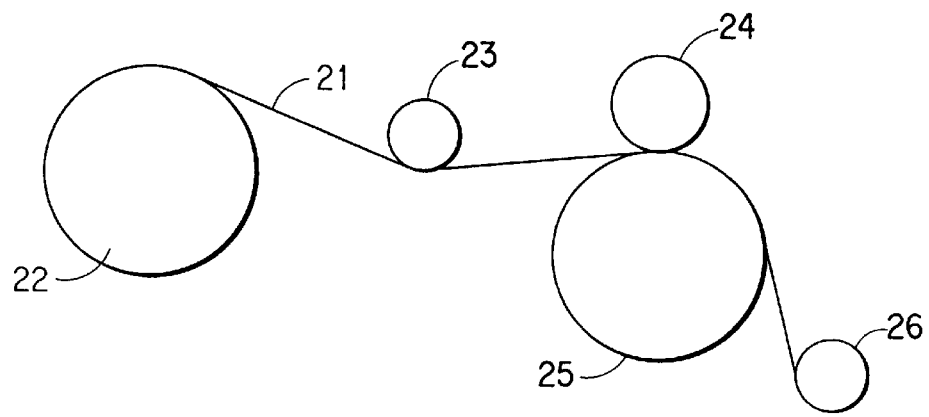
FIG. 2 is a schematic representation of a continuous embossing process similar to that in commercial use for embossing films, but also, with appropriate controls, suitable for embossing, in accordance with the present invention, fibrous sheets made from thermoplastic polymers, especially those having relatively low melting-temperature (e.g., polyolefins) wherein fibrous sheet 21 is forwarded from feed roll 22, under idler roll 23, through a nip formed by rubber-coverbed roll 24 and heated, hard embossing roll 25 to windup roll 26.
Figure 3:
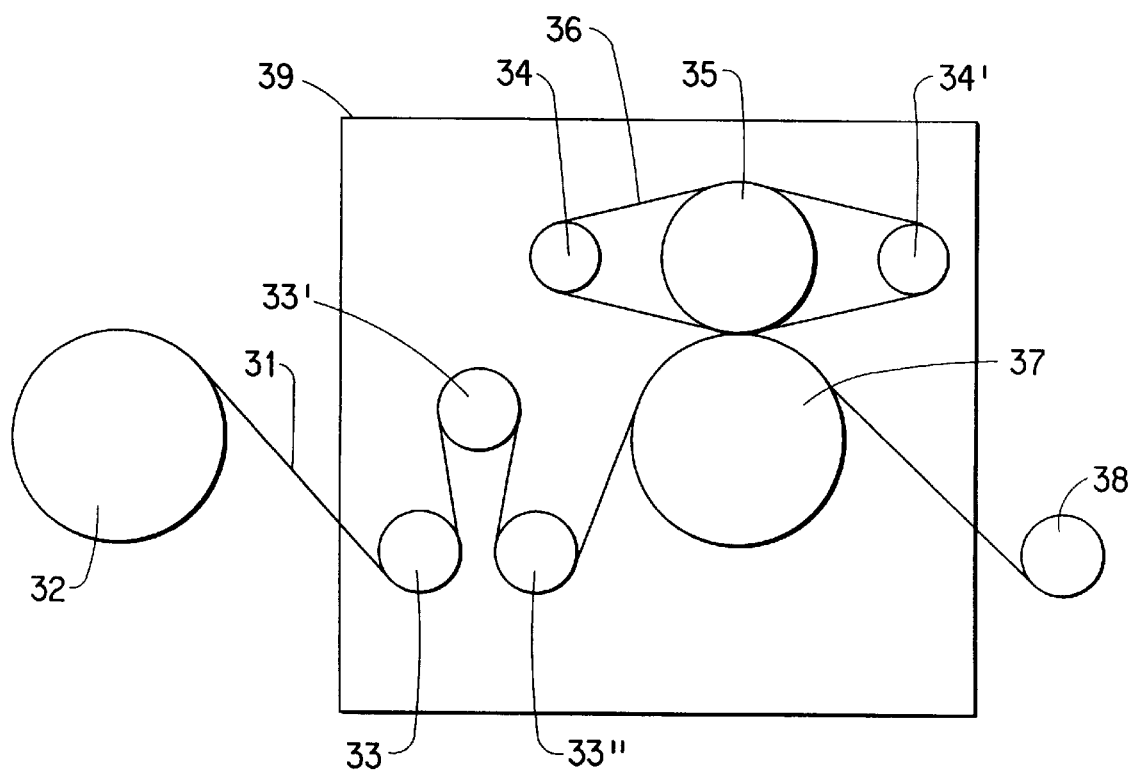
FIG. 3 is a schematic representation of a continuous roll embossing process designed to provide higher heat transfer rates and to attain higher embossing temperatures wherein fibrous sheet 31 is forwarded from feed roll 32 into thermally insulated chamber 39 and then successively into contact with the surface of heated rolls 33, 33' and 33", and heated embossing roll 37 and then to windup roll 38, sheet 31 being pressed against embossing 37 by rubber roll 35 through endless release-sheet belt 36 which proceeds around idler rolls 34 and 34'.

In addition to the batch or stepwise process and equipment described above with regard to FIG. 1, the process of the invention also can be performed in a continuous manner with roll embossing equipment, as illustrated in FIGS. 2 and 3, with or without sheaths on the rubber back-up rolls. The same type of equipment, modified for higher embossing temperatures and pressures, is also suitable for embossing sheets or fabrics made from fibrous elements of higher melting temperature thermoplastic polymers, such as polyesters and polyamides. The equipment of FIG. 2 is more suitable for high production rates on a commercial scale and is particularly suited for embossing sheets or fabrics of fibrous elements made from thermoplastic polymers having relatively low melting temperatures (e.g., polyolefins). As illustrated in FIG. 2, a sheet or fabric 21 of thermoplastic fibrous elements, is advanced from a supply roll 22, under idler roll 23, through a nip formed by rubber-sheathed back-up roll 24 and heated metallic embossing roll 25, and then to embossed sheet wind-up roll 26. This equipment can also be used, with or without a rubber sheath on the back-up roll, with fabrics made from higher melting fibers, such as polyamides and polyesters, provided that the embossing roll temperature is raised sufficiently and the roll speed is sufficiently reduced to improve heat transfer to the sheet surface and attain the desired softening temperature.

FIG. 3 depicts continuous process equipment more suited than the equipment of FIG. 2 for embossing diffraction patterns and hologram images on sheets or fabrics made from fibrous elements of polymers with relatively high melting temperatures (e.g., polyamides, polyesters). The equipment of FIG. 3 also permits higher speed embossing. As depicted in FIG. 3, fibrous sheet 31 is advanced from supply roll 32 over a set of heated idler rolls 33, 33' and 33" to heated metallic embossing roll 37 and then to embossed product wind-up roll 38. The heated rolls are designed to provide larger wrap angles and contact areas (as compared to the rolls of the equipment of FIG. 2) with a minimum of non-heated space in between the rolls. Rubber-sheathed roll 35 transmits pressure against embossing roll 37 through endless belt 36 made of a release material (e.g., ARMALON®) which runs around roll 35 and idler rolls 34 and 34'. To further improve the heat transfer and raise the fabric embossing temperature more rapidly, the entire system of heated idler rolls, heated embossing roll, rubber roll and release belt is enclosed in insulated chamber 39. Optionally, the sheet surface to be embossed, can be further heated by radiant heaters (not shown) located between idler roll 33" and embossing roll 37.

The processes illustrated in FIGS. 1, 2 and 3 for embossing rainbow or hologram images on fibrous sheets also can be performed in combination with conventional embossing of the sheets with large macroscopic size grooves or other relatively large relief patterns, in simultaneous or separate embossing steps. The simultaneous embossing of a hologram and a macroscopic relief pattern can be accomplished with equipment of the type depicted in FIG. 1. For example, a metal embossing plate having a macroscopic relief pattern (e.g., a screen mesh or a plate having a waffle pattern) can be placed under fibrous sheet 10 and over, or in place of, release sheet 13', with the relief surface facing the bottom of sheet 10, with the other equipment components of FIG. 1 remaining the same. Such simultaneous embossing of the fibrous sheet with macroscopic and hologram patterns subjects localized regions of the fibrous sheet along the macroscopic relief pattern to higher pressures than the surrounding areas. As a result, the regions subjected to higher pressures become somewhat thinner, develop deeper holographic grooves and exhibit stronger diffraction colors. The fibrous elements in the high pressure regions become more strongly consolidated and their embossed configurations become more durable and resistant to handling, washing and ironing. The thusly embossed fibrous sheet also has a special surface texture and reduced sheen. These added characteristics enhance the tactile and visual aesthetics and durability of fibrous sheets embossed with rainbow or hologram images.

As noted above, breathability, flexibility and tactile aesthetic properties of the fibrous sheet are substantially unaffected when a pattern of fine grooves is embossed in the surface of the fibrous sheet in accordance with the process of the invention. Some flattening of the embossed surface of the fibrous elements and some reduction in sheet thickness usually accompany the embossing, but negligible bonding occurs at fibrous element cross-over points, beyond that which already exists in the sheet or that which is intended to be developed during thermal embossing of fibrous sheets containing secondary filaments or particles of lower melting temperatures which are included to produce some pattern bonding or point bonding in the sheet structure.

In applying a fine-groove embossing pattern to a fabric according to the invention, the relative direction of the grooves and the filaments in the fabric has little effect on the resultant images. Substantially the same effect is obtained if the fine grooves are parallel, perpendicular, or at an angle to the filament axis. Also, the visibility of the rainbow and hologram images are substantially the same whether the fabric is wet or dry. Further, substantially the same quality of rainbow and hologram images can be obtained with fabrics in which the filaments are twisted, interlaced, cut, continuous, oriented, ordered or random or of round or other cross sections. However, for maintenance of the integrity of the embossed patterns, sheets or fabrics having embossed surfaces of high dimensional stability, such as woven, point bonded or pattern bonded fabrics, are highly desirable. Also, the fine groove patterns can be embossed on fibrous sheets of different colors, which contain conventional dyes, pigments or printed surface decoration, thereby adding dynamic colors and holographic images to the visual aesthetics of such sheets.

The rainbow and holographic images produced by the embossed pattern of fine grooves are best seen under the bright sunlight or bright incandescent lights. Accordingly, embossed sheets and fabrics of the invention are particularly suited for outdoor end uses, on stage, or in any other well lighted environment. Fibrous sheets and fabrics of the invention can be used in upholstery, decorative fabrics or papers, draperies, window shades, cvarpets, luggage, clothing, sportswear, beach wear, swim wear, ski wear, stage costumes, boat sails, parachutes, and the like.

EXAMPLES

The following examples illustrate the invention with the embossing of fine groove patterns on the surfaces of various woven, knit and nonwoven fabrics to produce rainbow or holographic images. Each of fabrics of the examples are made with thermoplastic fibers of nylon, polyester, polypropylene or polyethylene. Except for Example 12, each example employed an assembly of the type depicted in FIG. 1 to emboss the fabric.

Example 1

In this example, a rainbow image is produced on the surface of a woven nylon fabric by embossing the fabric with a diffraction grating in a heated platen press. A 109-g/$m^2$ oxford fabric, woven with 25 by 20 ends per cm from 220-decitex, 34-filament yarn, the filaments being of circular cross-section and formed of bright nylon 66, was scoured, dried and ironed to remove any finish and size. A 19-cm-by-24-cm swatch of the fabric was then used as the fibrous sheet 10 of FIG. 1. A hard embosser 12 (i.e., "stamper") in the form of a 10-cm-by-5-cm nickel sheet having a diffraction grating pattern on its embossing surface was employed. The diffraction grating consisted of parallel fine grooves spaced 1.3 micrometers apart. The stamper was placed, with the grooves in parallel orientation to the fabric weave, in the middle and on top of the fabric swatch. Release sheets 13 and 13' of ARMALON® TEFLON®-coated glass fabric, 0.16-cm thick rubber sheets 14 and 14' and 0.16-cm-thick, 30-cm-long, 23-cm wide stainless steel plates 15 and 15', were arranged above and below the fibrous sheet and stamper as shown in FIG. 1. The resulting assembly was placed in a 30-cm-by-30-cm Pasadena hydraulic platen press. The platens 16 and 16' were preheated to 215° C.; the press was closed; and for 3 minutes, a load of 9,600 Kg was applied (corresponding to a pressure of 1,350 KPa, or 196 psi, based on the area enclosed by rigid stainless steel plates 15 and 15', or to a pressure of 18,630 Kpa, or 2,705 psi, based on the area enclosed by stamper 12 ). The pressure was then released and the entire assembly removed from the press, placed on a table and allowed to cool under ambient conditions. After 3 minutes of cooling, the sandwich was separated into its component layers and the fabric was allowed to cool further to room temperature. Because a burning rubber smell was noted during the embossing, indicating some degradation of the rubber sheets 14 and 14', all subsequent embossing examples which employed assemblies of the type shown in FIG. 1 were conducted with temperature-resistant VITON® or silicone rubber sheets.

Examination of the embossed nylon fabric revealed that the surface area of the embossed region had become more shiny than the not-embossed area of the swatch, but the embossed area apparently did not suffer any damage to the weave pattern or lose any pliability and gas permeability. When the embossed surface was viewed at an angle relative to incident light from the sun or from an incandescent lamp, shimmering rainbow images became visible in different areas of the fabric depending on the orientation of the specific fabric area relative to the incident light. These rainbow images extended to the length of the embossed area and could be rolled over the fabric by holding one end of the fabric with one hand and raising or lowering the other end. The embossed swatch of woven nylon fabric was then washed and tumble dried in household laundering equipment and thereafter ironed with a hand iron on an ironing board. The resulting fabric continued to show the same rainbow images with the same intensity as before washing and ironing. The diffraction grating pattern embossed on the fabric was very stable. Scanning electron photomicrographs of a duplicate fabric sample prepared under identical conditions, showed the groove patterns on the filament surfaces in parallel orientation within and across the filaments in both the fill and the warp directions.

Example 2

The demonstration of Example 1 was duplicated except that Viton® rubber instead of the ordinary rubber sheets were employed and a slightly lower press embossing temperature was used (212 vs. 215° C.). Except for the elimination of the rubber-burning odor, the embossing results were the same as those obtained in Example 1. The thusly embossed fabric was then subjected to a laboratory-scale beck-dyeing process along with a comparison fabric swatch that was not subjected to the embossing process. At the end of the dyeing procedure with acid blue 120 dye, the dried and ironed fabric swatches were compared visually. The embossed swatch was found to have retained its ability to produce rainbow images but had a somewhat lighter dyed blue shade, both within and outside the embossed area, than the comparison swatch. Apparently, this effect resulted from an increased degree of crystallinity in the fiber polymer and reduced dye uptake, which were caused by the heat treatment of the fabric during the embossing.

Example 3

In this example, a plain weave white fabric consisting of 34 by 39 ends per cm of fine decitex nylon 66 containing titanium dioxide delustrant and weighing 63 g/$m^2$ was embossed with the same stamper and under the same conditions as used in the preceding examples, but at a temperature of 214° C. The resulting embossed region of the fabric also produced faint rainbow images upon exposure to the light from an incandescent lamp and strong rainbow images under sunlight.

Example 4

In this example, a Carver press with electrically heated, 23-cm-by-23-cm platens was employed with the diffraction grating stamper of the preceding examples to emboss a dyed-gray, heavy, nylon-66 twill fabric of 17-by-26 ends/cm weighing 233 g/m². The embossing was conducted at a temperature of 225° C. with a load of 9,800 Kg for 3 minutes (corresponding to a pressure of 1,835 KPa or 266 psi, based on the area enclosed by the rigid platens, or to a pressure of 19,414 KPa or 2,814 psi, based on the area enclosed by the stamper), followed by a cooling period of 3 minutes. Strong rainbow images were easily visible when the resultant embossed fabric was viewed under an electric lamp or sunlight.

Example 5

In this example, a turquoise-colored, ANTRON® nylon/ LYCRA® spandex, warp-knit swimwear fabric was embossed under the same conditions as were employed in Example 4. The fabric was knit with 19 wales/cm and 19 courses/cm and weighed 170 g/m². The fabric comprised 85% by weight of 44-dtex, 13-trilobal-filament, semi-dull nylon-66 yarn and 15% by weight of 44-dtex, coalesced-4-filament LYCRA® spandex yarn. The embossed fabric developed bright rainbow images, as in Example 4. Following a severe manual stretching and relaxation of the fabric in the diagonal directions, the intensity of the rainbow image was diminished but not eliminated.

Example 6

A woven, lightweight, white, polyester lining fabric having 41-by-28 ends/cm and weighing 50.5 g/m² was embossed with the diffraction grating pattern of the preceding Examples in the Carver press at a temperature of 200° C. under a load of 16,350 Kg (corresponding to a pressure of 3,060 KPa or 444 psi based on the area enclosed by platens 16, 16' or to a pressure of 32,375 Kpa or 4,706 psi based on the area enclosed by stamper 12). Upon release of the load, the fabric was immediately removed from the embossing assembly and allowed to cool. The resultant embossed fabric exhibited rainbow images similar to those exhibited by the nylon fabrics of Examples 1–4.

Example 7

A white satin Monice polyester fabric weighing 130 g/m² and having one face with long floats and 19-by-25 ends/cm and a back face (the satin side) with 33-by-28 ends/cm, was embossed with the diffraction grating stamper of the preceding examples under the same conditions as employed in Example 6. The fine grooves of the stamper were parallel to the long floats. The resultant embossed portions of the fabric exhibited rainbow images when subjected to the light from an incandescent lamp.

Example 8

A swatch of 45.4 g/m² TYVEK® spunbonded olefin, a nonwoven sheet formed of randomly deposited plexifilamentary strands of polyethylene film fibrils was cut from a disposable uniform. The nonwoven polyethylene sheet sample was embossed in an assembly of the type shown in FIG. 1 between the platens of the Carver Press (described in Example 4) at a temperature of 90° C. and for 3 minutes under a load of 2,273 Kg (corresponding to a pressure of about 427 KPa or 62 psi based on the area enclosed by platens 16, 16' or to a pressure of 4,517 Kpa or 657 psi based on the area enclosed by stamper 12). Rainbow images were visible in the embossed area of the sheet when the sheet was viewed at an angle to incident incandescent light or sunlight. Scanning electron photomicrographs of the embossed surface area showed faint fine grooves of the diffraction pattern on the randomly distributed plexifilamentary strands of the TYVEK® fabric.

Example 9

In this example, the diffraction grating stamper of the preceding Examples was replaced with a 16.5-cm-by-16.5-cm hologram stamper sheet containing nine 4.2-cm-by-4.2-cm hologram pictures of different sports activities. The same white satin Monice polyester fabric as was used in Example 7 was also used in this example. An assembly of the type depicted in FIG. 1 containing the fabric and the hologram stamper was pressed in the Carver press (described in Example 4) at a temperature of 210° C. under a load of 13,600 Kg for 3 minutes (corresponding to a pressure of 2,516 KPa or 365 psi based on the area enclosed by platens 16, 16' or to a pressure of 4,517 Kpa or 657 psi based on the are of stamper 12). The assembly was not allowed to cool before the fabric was separated from the assembly. The embossed area exhibited the colored hologram images of the original hologram stamper when the embossed areas of the fabric were viewed at an angle to incident sunlight or light from an incandescent lamp. Just as in the stamper itself, the images were complete, continuous and uniform.

Example 10

This example repeats Example 9, except that (a) the fabric being embossed was a red satin twill made from 220-decitex nylon yarn, (b) the pressing temperature was 225° C. and (c) the assembly was allowed to cool for three minutes before the embossed fabric was separated from the assembly. As in Example 9. the embossed fabric reproduced the hologram pictures of the of original embossing stamper. The hologram images from the embossed fabric surface were complete and continuous when viewed at an angle to incident light from an incandescent lamp or sunlight.

Example 11

In this example, a parachute fabric weighing about 30 g/m² was embossed in an assembly similar to that depicted in FIG. 1 with the diffraction grating stamper in the Pasedena press of Example 1 at a temperature of 215° C. under a platen load of 9,545 Kg for 3 minutes (corresponding to a pressure of 1,350 KPa or 196 psi based on the area enclosed by platens 16, 16' of to a pressure of 18,630 Kpa or 2,705 psi based on the are enclosed by stamper 12). The fabric was made from, high tenacity, 33-dtex, 10-filament, bright, nylon-66 yarns in a "rip-stop" square woven configuration with repeating cycles of 14 single ends/cm followed by two double ends and a total of 2.6 cycles/cm in both directions. The fabric was dimensionally stable (i.e., it was not stretchable). Even though the fabric was of very light weight and had a relatively open construction, the embossed fabric exhibited a clear, continuous rainbow image when the surface was viewed at an angle to incident sunlight or incandescent light.

Example 12

This example illustrates the embossing of a warp-knit polypropylene fabric. The equipment employed was of the type depicted in FIG. 2. As noted below, with the particular equipment used, the embossing pressure in the nip of the rolls was insufficient to permit continuous embossing of the fabric at commercially desired speeds. However, the results did indicate how such a continuous run could be accomplished. The particular fabric employed in this example was a 127-cm-wide, black, polypropylene, double-knit fabric with a "Ponta di Roma" construction. The fabric, which had 12.6 courses per cm and 6.3 wales/cm, weighed 205 g/m$^2$. Commercial, continuous, 152-cm-wide roll embossing equipment of the type usually used for embossing holograms on plastic films, was employed. Initially an embossing test was run with a 180 degree fabric wrap angle on metallic embossing roll 25, and with the embossing roll operating at a surface temperature (measured with an infrared thermometer) of 135° C., which was very close to the 138° C. softening point of the polypropylene yarns. Metal embossing roll 25 and rubber roll 24 (having a Shore A durometer hardness of 70) formed the nip through which fabric 21 passed at a linear speed of 60 cm/min, the minimum speed achievable with the equipment. The temperature of the fabric leaving the roll was 120° C. The embossing pressure on the nip formed by rolls 24 and 25 was set at the highest that could be achieved with the equipment. Under these conditions, with fibrous sheet speed at 60 cm/min, satisfactory embossing of the fabric was not achieved. However, under the same conditions of temperature and load, but with the fabric being allowed to remain in the nip between rolls 24 and 25 for 30 seconds, satisfactory embossing of the hologram pattern was obtained on the area contacted in the nip. The width of the embossed contact area measured about 1.52 cm near the edge of the fabric and about 1.27 cm near the center of the fabric, indicating that the pressure was non-uniformly distributed across the entire width of the fabric. When these embossed areas were viewed at an angle to incandescent light or sun light, a clear colorful hologram pattern was apparent. From the dimensions of these embossed areas and the load applied thereto, the pressure in the nip was calculated to be about 1,288 KPa (187 psi) in the area at the fabric edge and about 1213 KPa (176 psi) in the area near the center of the fabric. When the embossed area of the fabric was hand-stretched in the machine direction, the hologram pattern substantially disappeared, but reappeared when the fabric was allowed to relax, indicating that the embossed fine grooves returned to their original position, in register with the grooves of adjacent filaments. The above-stated results show that a successful continuous process for embossing a hologram pattern on the polypropylene fabric of this example could be achieved at a speed of about 3 cm/minute with the temperatures and pressures employed in this example. Also, preheating of the fabric, higher temperatures (below the polymer melting temperature) and higher, more uniform nip pressures would be needed to perform continuous hologram embossing at higher speed.

Example 13

This example illustrates embossing rainbow or hologram diffraction patterns on a 190-g/m$^2$ polyester satin fabric, similar in construction to the fabric of Example 7, with an electrically induction heated stamper.

Equipment similar to that illustrated in FIG. 1 was modified for use with electrical induction heating instead of oil or electrical resistance heating. Release sheet 13, rubber sheet 14 and flat metal plates 15 and 15' were not included in the equipment. Hard metal embosser 12 (i.e., the "stamper") was attached to platen 16 with a hard electrical insulating layer sandwiched between the stamper and the platen. The embossing surface of stamper 12 was arranged to face the surface of the fibrous sheet 10 that was to be embossed. The embossing stamper was a metal plate having a 7.6 cm×7.0 cm area with a "Quarter Inch Square" holographic pattern. Fabric samples were embossed by (a) assembling a fabric sample (i.e., fibrous sheet 10), release sheet 13' and the rubber sheet 14'; (b) placing the thusly formed assembly between the lower platen 16' and hard embosser surface which is attached to upper platen 16; (c) closing the platens on the assembly; (d) applying pressure to platen 16; (d) sending an electrical induction current through the metal embosser 12 for a predetermined period of time, referred to as "power time"; (e) maintaining the pressure for an additional period of time, referred to as "settling time"; (f) releasing the pressure and lifting upper platen 16; and (g) removing the assembly and separating the embossed fibrous sheet therefrom. Note that, in this equipment, the embossing temperature could not be measured directly. Instead, the induction current and the power time were used in combination as an indirect measure of fabric temperature. The equipment was operated manually.

A small number of trials were performed to determine the optimum embossing conditions needed to produce fabric samples having, subjectively judged, "very good" hologram images and "very good" wrinkle resistance. The optimum conditions were a pressure of 8,360 KPa, and an induction current of 280 ampere applied for 10 to 13 seconds power time and followed by a 7-second a settling time. Under more severe embossing conditions, a power time of 15.5 seconds and settling times of 16 to 35 seconds, provided fabric samples with "excellent" holographic images and wrinkle resistances, but some filament-to-filament melt cohesion (i.e., some fusion) occurred in an area of about 5 cm$^2$ in the center of the embossed area. The fused area was translucent when viewed by transmitted light while the rest of the area surrounding it was opaque. Under milder embossing conditions (i.e., decreased power time), the color intensity of the hologram images decreased from "very good" to "good" when power time was 8.5 seconds and to "faint" when power time was 6.5 seconds. The corresponding resistance to wrinkling also diminished to "medium" and "poor", respectively. These tests also showed that fabric thickness decreased with increasing severity of embossing conditions. The thickness decrease trend was accompanied by corresponding increases in the brightness of the hologram images and increases in the wrinkle resistance of the fabric. For this polyester satin fabric, a decrease in thickness of 30–35% was accompanied by good wrinkle resistance. Poor wrinkle resistance was obtained when the thickness decrease was only 20–30%. Microscopic examination of the surface of the optimally embossed fabric showed that the yarns, at the weave crossover points, were flattened, and that the surface filaments were tightly held together, and well anchored to filaments below the surface, but without any melt fusion. Increased wrinkle resistance was found to accompany the greater flattening.

Example 14

This example illustrates the use of semi-continuous, "step-and-repeat" holographic embossing equipment for embossing relatively large pieces of fibrous sheets. The same polyester satin woven fabric as was used in the Example 13 was used as the fibrous sheet in this example. The equipment was fitted with an indexed, moving fabric-feeding table to increase production speed and to more precisely place embossing patterns in predetermined locations on the surface of a fibrous sheet or fabric sample. The embossing equipment was moved to specific areas of fabric surface under the embossing stamper and was automatically controlled to pre-specified time intervals and embossing conditions. The specific assembly of fabric 10 and equipment components were the same as described in Example 13, except that in this example no release sheets 13, 13' were used at all. Fabric 10 was placed on top of the 0.16-cm thick silicone rubber sheet 14' which in turn was placed on a flat rigid plate 15' made of plastic instead of metal This assembly was then fastened to a metal tray and moving arm of the indexing system. The indexing system was programmed to emboss 5.7-cm×7.6-cm areas of the fabric (with a stamper of equal dimensions) spaced 1.5-cm apart in the longitudinal direction and 0.64-cm apart in the transverse direction of the feeder.

Six panels of "Quarter Inch Square" holographic patterns were embossed on a 38-cm×38-cm area of fabric with the equipment described in the preceding paragraph with an 5-ton embossing load (equivalent to a pressure of 10,134 KPa or 1,481 psi), a 300-ampere induction current, a 22-second power time and a 25-second settling time. The hologram quality, in terms of clarity and brightness on exposure to direct light, was "excellent" in all six panels. The holographic patterns were uniform within each panel and from panel to panel, with no signs of filament fusion anywhere on fabric surface. As a result of the embossing, the thickness of the fabric decreased by 30% from 0.20 mm before embossing to 0.14 mm after embossing.

This Example 14, along with Examples 12 and 13, indicate that the complicated, multi-layer assembly employed in the batch process of FIG. 1 and the earlier illustrative examples herein, can be significantly simplified. In a continuous or semi-continuous processes, the fabric can be placed directly between the stamper embossing surface on one side and the rubber surface on the other side, with a release sheet between the fabric and the rubber sheet as in Example 13 and FIG. 3, or without release sheet as in Examples 12 and 14 and FIG. 2.

I claim:

1. A process for making a fibrous sheet that produces rainbow or hologram images, comprising the steps of preparing a sheet of fibrous elements;

softening at least the fibrous elements on a surface of the sheet;

placing the sheet on a supporting surface;

bringing a hard embosser having a surface with a pattern of fine grooves thereon into direct contact with the surface of the fibrous sheet having the softened fibrous elements, the grooves being spaced apart uniformly by about 0.1 to 10 microns and being at least 0.01 microns deep;

imposing sufficient load on the embosser for a sufficient time to impress the pattern of fine grooves into the surface of the softened fibrous elements on the surface of the sheet with negligible bonding of fibrous element cross-over points, the patterns of fine grooves on the individual fibrous elements of the sheet surface continuing to neighboring fibrous elements substantially in phase, with the distance between the last groove on one fibrous element and the first groove of the neighboring fibrous element being a multiple of groove width;

separating the sheet from the embosser; and collecting the separated sheet.

2. A process according to claim 1 wherein the fibrous elements comprise thermoplastic organic polymer and the fibrous elements are softened by heating the sheet surface to a temperature above the softening temperature of the polymer but below the melting temperature of the polymer.

3. A process according to claim 2 wherein the fibrous sheet is a woven fabric or knit fabric comprised of polypropylene, polyester or nylon yarns.

4. A process according to claim 2 wherein the fibrous sheet is a nonwoven fabric.

5. A process according to claim 4 wherein the nonwoven sheet is a spunbonded olefin sheet of plexifilamentary strands of polyethylene film fibrils.

6. A process according to claim 1 wherein softening of the fibrous elements is performed before the fibrous sheet is placed in contact with the embosser.

7. A process according to claim 1 wherein softening of the fibrous elements is performed while the fibrous sheet is in contact with the embosser.

* * * * *